United States Patent Office 3,389,144
Patented June 18, 1968

3,389,144
5-PYRIDYL-2,3,4,5-TETRAHYDRO-
BENZOTHIEPIN-5-OLS
Richard J. Mohrbacher, Fort Washington, and Vasken
Paragamian, Dresher, Pa., assignors to McNeil Laboratories, Incorporated, a corporation of Pennsylvania
No Drawing. Continuation-in-part of application Ser. No. 462,408, June 8, 1965. This application May 2, 1967, Ser. No. 635,401
4 Claims. (Cl. 260—294.8)

ABSTRACT OF THE DISCLOSURE 5-pyridyl-2,3,4,5-tetrahydrobenzothiepin-5-ols useful as hypotensive agents. The compounds are prepared by reacting a 3,4-dihydro-1-benzothiepin-5(2H)-one with pyridyl lithium or pyridyl magnesium halides.

This application is a continuation-in-part of my copending application Ser. No. 462,408, filed June 8, 1965, now abandoned.

This invention relates to certain novel substituted benzothiepins. More particularly, it is concerned with tetrahydrobenzothiepin-5-ols having the formula

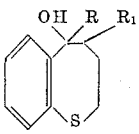

wherein R is a member of the group consisting of 2-pyridyl, 3-pyridyl and 4-pyridyl; $R_1$ is a member of the group consisting of hydrogen and diloweralkylaminomethyl; and the non-toxic acid addition salts and the therapeutically active loweralkyl quaternary ammonium derivatives thereof. R may be phenyl, in which event when $R_1$ is hydrogen, no acid addition salts or loweralkyl quaternary ammonium derivatives are possible. $R_1$ may be a member selected from the group consisting of piperidinomethyl, pyrrolidinomethyl and morpholinomethyl; likewise, $R_1$ may be a member selected from the group consisting of piperazinomethyl, N-lower-alkyl-piperazinomethyl and N-aryl-piperazinomethyl.

As used herein loweralkyl may be straight or branch chained and have from 1 to 6 carbon atoms, such as, for example, methyl, ethyl, propyl, isopropyl, butyl, isobutyl, tertiary butyl and the like.

The therapeutically active non-toxic acid addition salts of the basic nitrogen containing compounds are prepared by treatment with an appropriate acid such as an inorganic acid, e.g., hydrochloric, hydrobromic, hydriodic, sulfuric, nitric or phosphoric; an organic acid such as acetic, propionic, glycolic, latic, pyruvic, malonic, succinic, maleic, malic, fumaric, tartaric citric, benzoic, mandelic, cinnamic, methane, sulfonic, benzene sulfonic salicylic, 2-phenoxybenzoic. Conversely the salt form may be converted in the usual manner into the free base.

The novel basic nitrogen containing compounds may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; dilower alkyl-sulfates—dimethylsulfate, diethylsulfate; lower alkylaryl-sulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as diethylether or tetrahydrofuran, hydrocarbons such as benzene and heptane, ketones such as acetone and butanone, loweralkanols such as ethanol, propanol or butanol; or organic acid amides such as formamide or dimethylformamide. When lower alkyl halogenides are used as quaternizing agents, diethyl ether and benzene are the preferred solvents.

The compounds of this invention have been found to possess valuable pharmacological properties as hypotensive agents. For example, in the compound in which R is 2-pyridyl and $R_1$ is hydrogen, intraveneous administration of 8-10 mg./kg. of body weight to an anesthetized dog causes a blood pressure lowering effect of 40 mm. of Hg. The corresponding acid addition salts have the same utility as the basic nitrogen containing compounds.

The compounds of this invention wherein R is pyridyl and $R_1$ is hydrogen, diloweralkylaminomethyl or cyclic aminomethyl, such as piperidinomethyl, pyrrolidinomethyl, morpholinomethyl, piperazinomethyl, N-loweralkyl-piperazinomethyl or N-aryl-piperazinomethyl, are prepared by slowly adding a solution of a 4-substituted-3,4-dihydro-1-benzothiepin-5(2H)-one (wherein the 4-substituent is an $R_1$ member as defined above) in a suitable solvent such as benzene to a solution of pyridyl lithium in a suitable solvent such as anhydrous ether which has been cooled.

The compounds of this invention wherein the 5-substituent is phenyl and $R_1$ is hydrogen, diloweralkyl-aminomethyl or cyclic aminomethyl (as defined hereinabove) are prepared by slowly adding a solution of a 4-substituted - 3,4-dihydro-1-benzothiepin-5(2H)-one (wherein the 4-substituent is an $R_1$ member as defined above) in a suitable solvent such as benzene to a solution of phenyl lithium in a suitable solvent such as ether.

In place of using the phenyl lithium or the pyridyl lithium reagents, the corresponding phenyl magnesium or pyridyl magnesium halides can be used.

The following examples are intended to illustrate, but not to limit, the scope of the present invention.

Example I

A solution of 2-pyridyl lithium is prepared by the addition of 20 g. (0.126 mole) of 2-bromopyridine to a stirred solution of butyl lithium (012 mole in 100 ml. of hexane) in 400 ml. of anhydrous ether at —40° C. After 15 minutes, 17.8 g. (0.1 mole) of 3,4-dihydro-1-benzothiepin-5-(2H)-one in 100 ml. of benzene is added over a period of 5 minutes. During the next hour, the temperature rises gradually from —40° C. to room temperature. The slurry is poured into dilute, iced hydrochloric acid. Crystalline hydrochloride salt precipitates and is removed by filtration. Conversion of the acid salt to the free base yields 10.4 g. of crystalline free base. Basification of the original acidic filtrate followed by benzene extraction yields, after concentration of the organic layer, an additional batch of base crystals. Three recrystallizations from cyclohexane-hexane produces crystals; M.P. 79–80.5° C. The product is 2,3,4,5-tetrahydro-5-(2-pyridyl)-1-benzothiepin-5-ol.

Example II

A mixture of 17.8 g. (0.1 mole) of 3,4-dihydro-1-benzothiepin-5(2H)-one, 10.6 g. (0.13 mole) of dimethylamine hydrochloride, 3.96 g. (0.044 mole) of paraformaldehyde and 0.2 ml. of concentrated hydrochloric acid in 20 ml. of 95 percent ethanol is refluxed with stirring for 3 hours. After slight cooling 80 ml. of acetone is added. Cooling in the refrigerator yields white crystals. Two recrystallizations from 95 percent ethanol-acetone produces white crystals of 4-dimethylaminomethyl-3,4-dihydro-1-benzothiepin-5(2H)-one hydrochloride; M.P., 182–4° C.

Example III

A solution of 58.8 g. (0.25 mole) of 4-dimethylaminomethyl-3,4-dihydro-1-benzothiepin-5(2H)-one in 500 ml. of benzene is added over a period of 10 minutes to a solution of 0.55 mole of phenyl lithium (prepared from bromobenzene and lithium) in 840 ml. of ether. The reaction mixture is stirred at reflux for 22 hours. After cooling, the mixture is decomposed with 300 ml. of water. The organic layer is separated and the aqueous phase is extracted with ether. The combined ethereal solution is washed with water, then with saturated brine, and dried over magnesium sulfate. After removal of the drying agent, benzene is added, causing precipitation of white crystals. One recrystallization from ethyl acetate-petroleum ether (30–60° C.) yields white crystals of 4-dimethylaminomethyl-2,3,4,5-tetrahydro-5-phenyl-1 - benzothiepin-5-ol; M.P., 135–140° C.

Example IV

A solution of 2-pyridyl lithium is prepared by the addition of 20 g. (0.126 mole) of 2-bromopyridine to a stirred solution of butyl lithium (0.12 mole in 100 ml. of hexane) in 400 ml. of anhydrous ether at —40° C. After 15 minutes 23.5 g. (0.1 mole) of 4-dimethylaminomethyl-3,4-dihydro-1-benzothiepin-5(2H)-one in 100 ml. of benzene is added over a period of 10 minutes. The temperature is gradually raised from —40° C. to reflux and maintained there for 22 hours. After cooling, the mixture is decomposed with 150 ml. of water. The organic layer is separated and the aqueous phase is extracted with ether. The combined ethereal soltuion is washed with water, then saturated brine, and dried over magnesium sulfate. After removal of the drying agent, the solution is evaporated to dryness to obtain 4-dimethylaminomethyl-2,3,4,5-tetrahydro-5-(2-pyridyl)-1-benzothiepin-5-ol.

Example V

A solution of 17.8 g. (0.1 mole) of 3,4-dihydro-1-benzothiepin-5(2H)-one in 100 ml. of benzene is added over a period of 10 minues to a solution of 0.2 mole of phenyl lithium (prepared from bromobenzene and lithium) in 500 ml. of anhydrous ether with cooling. During the next hour the temperature is allowed to rise gradually to room temperature. The mixture is decomposed with 150 ml. of water. The organic layer is separated and the aqueous phase is extracted with ether. The combined ethereal solution is washed with water, then with saturated brine, and dried over magnesium sulfate. After removal of the drying agent, and concentration of the organic phase, addition of hexane results in precipitation of 2,3,4,5-tetrahydro-5-phenyl-1-benzothiepin-5-ol.

Example VI

Using the procedure of Example I and replacing 2-bromopyridine with equivalent amounts of 3-bromopyridine and 4-bromopyridine, the products obtained are 2,3,4,5-tetrahydro-5-(3-pyridyl)-1-benzothiepin-5-ol;
2,3,4,5-tetrahydro-5-(4-pyridyl)-1-benzothiepin-5-ol.

Example VII

Using the procedure of Example II and replacing dimethylamine hydrochloride with equivalent amounts of the hydrochloride salt of diethylamine, dipropylamine, diisobutylamine, and dibutylamine, the products obtained are 4-diethylaminomethyl-3,4-dihydro-1-benzothiepin-5(2H)-one;
4-dipropylaminomethyl-3,4-dihydro-1-benzothiepin-5(2H)-one;
4-diisobutylaminomethyl-3,4-dihydro-1-benzothiepin-5(2H)-one;
4-dibutylaminomethyl-3,4-dihydro-1-benzothiepin-5(2H)-one.

Example VIII

Using the procedure of Example II and replacing dimethylamine hydrochloride with equivalent amounts of the hydrochloride salt of piperidine, pyrrolidine, morpholine, piperazine, N-methyl-piperazine, N-ethyl-piperazine, N-butyl-piperazine, and N-phenyl-piperazine, the products obtained are 4-piperidinomethyl-3,4-dihydro-1-benzothiepin-5(2H)-one;
4-pyrrolidinomethyl-3,4-dihydro-1-benzothiepin-5(2H)-one;
4-morpholinomethyl-3,4-dihydro-1-benzothiepin-5(2H)-one;
4-piperazinomethyl-3,4-dihydro-1-benzothiepin-5(2H)-one;
4-N-methyl-piperazinomethyl-3,4-dihydro-1-benzothiepin-5(2H)-one;
4-N-ethyl-piperazinomethyl-3,4-dihydro-1-benzothiepin-5(2H)-one;
4-N-butyl-piperazinomethyl-3,4-dihydro-1-benzothiepin-5(2H)-one;
4-N-phenyl-piperazinomethyl-3,4-dihydro-1-benzothiepin-5(2H)-one.

Example IX

Using the procedure of Example III and replacing 4-dimethylaminomethyl - 3,4 - dihydro - 1 - benzothiepin-5(2H)-one with equivalent amounts of each of the products of Example VII, the products obtained are 4-diethylaminomethyl-2,3,4,5-tetrahydro-5-phenyl-1-benzothiepin-5-ol;
4-dipropylaminomethyl-2,3,4,5-tetrahydro-5-phenyl-1-benzothiepin-5-ol;
4-diisobutylaminomethyl-2,3,4,5-tetrahydro-5-phenyl-1-benzothiepin-5-ol;
4-dibutylaminomethyl-2,3,4,5-tetrahydro-5-phenyl-1-benzothiepin-5-ol.

Example X

Using the procedure of Example III and replacing 4-dimethylaminomethyl - 3,4 - dihydro - 1 - benzothiepin-5(2H)-one with equivalent amounts of each of the products of Example VIII, the products obtained are 4-piperidinomethyl-2,3,4,5-tetrahydro-5-phenyl-1-benzothiepin-5-ol;
4-pyrrolidinomethyl-2,3,4,5-tetrahydro-5-phenyl-1-benzothiepin-5-ol;
4-morpholinomethyl-2,3,4,5-tetrahydro-5-phenyl-1-benzothiepin-5-ol;
4-piperazinomethyl-2,3,4,5-tetrahydro-5-phenyl-1-benzothiepin-5-ol;
4-N-methyl-piperazinomethyl-2,3,4,5-tetrahydro-5-phenyl-1-benzothiepin-5-ol;
4-N-ethyl-piperazinomethyl-2,3,4,5-tetrahydro-5-phenyl-1-benzothiepin-5-ol;
4-N-butyl-piperazinomethyl-2,3,4,5-tetrahydro-5-phenyl-1-benzothiepin-5-ol;
4-N-phenyl-piperazinomethyl-2,3,4,5-tetrahydro-5-phenyl-1-benzothiepin-5-ol.

Example XI

Using the procedure of Example IV and replacing 4-dimethylaminomethyl - 3,4 - dihydro - 1 - benzothiepin-5(2H)-one with equivalent amounts of each of the products of Example VII, the products obtained are:

4-diethylaminomethyl-2,3,4,5-tetrahydro-5-(2-pyridyl)-1-benzothiepin-5-ol;
4-dipropylaminomethyl-2,3,4,5-tetrahydro-5-(2-pyridyl)-1-benzothiepin-5-ol;
4-diisobutylaminomethyl-2,3,4,5-tetrahydro-5-(2-pyridyl)-1-benzothiepin-5-ol;
4-dibutylaminomethyl-2,3,4,5-tetrahydro-5-(2-pyridyl)-1-benzothiepin-5-ol.

Example XII

Using the procedure of Example IV and replacing 4-dimethylaminomethyl - 3,4 - dihydro - 1 - benzothiepin-5(2H)-one with equivalent amounts of each of the products of Example VIII, the products obtained are 4-piperidinomethyl-2,3,4,5-tetrahydro-5-(2-pyridyl)-1-benzothiepin-5-ol;
4-pyrrolidinomethyl-2,3,4,5-tetrahydro-5-(2-pyridyl)-1-benzothiepin-5-ol;
4-morpholinomethyl-2,3,4,5-tetrahydro-5-(2-pyridyl)-1-benzothiepin-5-ol;
4-piperazinomethyl-2,3,4,5-tetrahydro-5-(2-pyridyl)-1-benzothiepin-5-ol;
4-N-methyl-piperazinomethyl-2,3,4,5-tetrahydro-5-(2-pyridyl)-1-benzothiepin5-ol;
4-N-ethyl-piperazinomethyl-2,3,4,5-tetrahydro-5-(2-pyridyl)-1-benzothiepin5-ol;
4-N-butyl-piperazinomethyl-2,3,4,5-tetrahydro-5-(2-pyridyl)-1-benzothiepin5-ol;
4-N-phenyl-piperazinomethyl-2,3,4,5-tetrahydro-5-(2-pyridyl)-1-benzothiepin-5-ol.

We claim:
1. 2,3,4,5-tetrahydro-5-(2-pyridyl)-1-benzothiepin-5-ol.
2. 2,3,4,5-tetrahydro-5-(3-pyridyl)-1-benzothiepin-5-ol.
3. 2,3,4,5-tetrahydro-5-(4-pyridyl)-1-benzothiepin-5-ol.
4. A member selected from the group consisting of tetrahydrobenzothiepin-5-ols having the formula

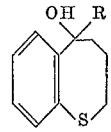

wherein R is a member of the group consisting of 2-pyridyl, 3-pyridyl and 4-pyridyl; and the non-toxic salts thereof.

References Cited

UNITED STATES PATENTS 3,234,235   2/1966   Davis et al. _____ 260—327

NICHOLAS S. RIZZO, *Primary Examiner.*

J. TOVAR, *Assistant Examiner.*